June 6, 1961     W. H. EVANS ET AL     2,987,651
APPARATUS FOR CONTROLLING AND PROTECTING ELECTRIC MOTORS
Filed Jan. 27, 1959
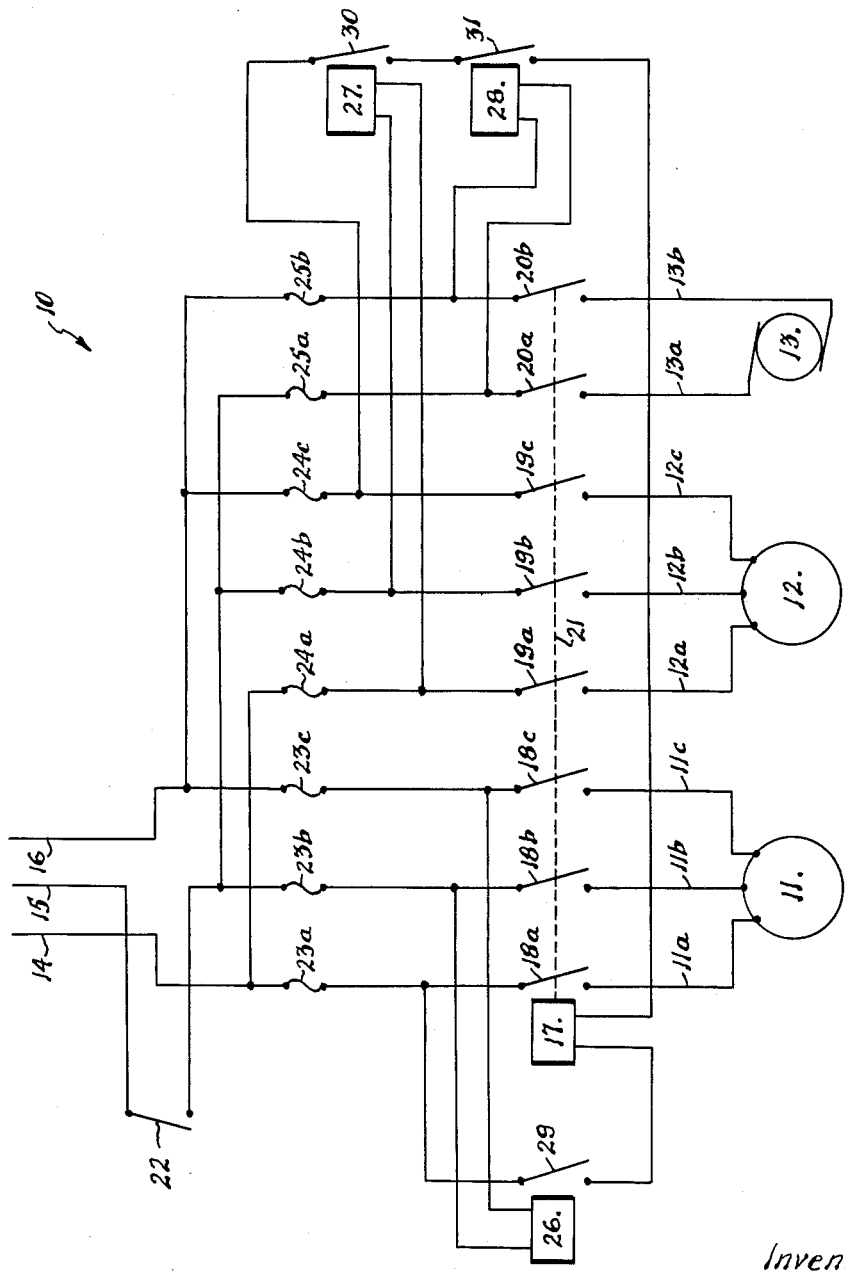
Inventors:
William H. Evans
Keith R. Low
By Munson H. Lane
Atty.

United States Patent Office 2,987,651
Patented June 6, 1961

2,987,651
APPARATUS FOR CONTROLLING AND PROTECTING ELECTRIC MOTORS
William H. Evans, 3807 16th St., Gulfport, Miss., and Keith R. Low, 123½ Pass Road, Biloxi, Miss.
Filed Jan. 27, 1959, Ser. No. 789,276
4 Claims. (Cl. 317—13)

This invention relates to new and useful improvements in devices or apparatus for control and protection of electric motors, and the principal object of the invention is to provide simple, highly dependable and practical means for protecting a plurality of such motors against damage arising from either power failure or mechanical malfunctioning.

Our invention provides means for stopping a plurality of motors of multiphase and single phase types which are required to start and stop simultaneously, and for protecting the group of motors from damage because of failure of any one of the motors, whether such failure results from a malfunction of the motor itself or from a complete or partial failure of the power supply.

More specifically our invention is an apparatus for controlling and protecting a plurality of electric motors which are connected to a common multiphase current supply, at least one of said motors being a single phase motor and at least one other of said motors being a multiphase motor, said single phase motor being connected by separate current leads to said common current supply, comprising a main relay having a coil and a plurality of switches which are simultaneously closed and opened upon energization and de-energization of said coil respectively, said coil of said main relay being connected to a single phase of said multiphase current supply, said switches being arranged in groups in the separate leads to each electric motor wherein a switch is connected in each of the current leads from said current supply to each of said motors, and control relays, there being one for each of the respective motors, each control relay having a coil and a set of switch points which are closed when the associated coil is energized, the coils of said control relays being connected in separate circuits each to a single phase of said current supply and the switch points thereof being connected in series with one another and with the coil of said main relay to a single phase of the current supply, whereby said motors may be simultaneously deenergized by opening of any one of said control relays, there being at least one control relay coil connected across each phase of said current supply utilized by said plurality of motors except the phase to which the main relay is connected.

An important feature of the invention resides in its ability to control and protect several motors which may be of different horsepower ratings and some of which may be of the three-phase type while others are single phase, the arrangement of the invention being such that all the motors under control of the apparatus are automatically de-energized in the event of malfunctioning of any one of them. As such, the invention is particularly well suited for use in the art of refrigeration or air conditioning, although it is to be understood that the use of the invention is not limited to this environment and that the invention may be utilized wherever unitary control of several motors is desired.

Another important feature of the invention resides in the provision of a unitary control for several motors which does not employ any heat-responsive overload or safety devices apart from conventional fuses, or the like, and wherein a source of malfunctioning may be quickly and easily spotted by service personnel without expenditure of valuable time and effort.

Another important feature of the invention resides in its ability to positively safeguard against "single-phasing" of three-phase motors in the event of partial failure of a three-phase current source, such as for example, when one of a group of motors deriving power from a common source of current becomes overloaded and causes blowing of a fuse in a three-phase circuit which results in a tendency of three-phase motors in the group to "single phase."

Some of the advantages of the invention lie in its simplicity of construction including wiring connections, in its dependability, and in its adaptability for use in various different environments.

With the foregoing more important objects and features in view and such other objects and features as may become apparent as this specification proceeds, the invention will be understood from the following description taken in conjunction with the accompanying drawings, wherein like characters of reference are used to designate like parts, and wherein the single drawing figure is a wiring diagram of the various components of the apparatus in accordance with the invention, the several switches being shown in the open position although they are normally closed when the apparatus is in operation.

Referring now to the accompanying drawings in detail, the motor control and protective apparatus is designated generally by the reference numeral 10 and, in the example illustrated, is utilized in association with a plurality of electric motors, namely, two three-phase motors 11, 12, and a single phase motor 13. These motors may have different horsepower ratings, but all derive their source of current from a common power supply, namely, a three-phase power supply represented by the conductors 14, 15, 16.

The apparatus 10 embodies in its arrangement a main relay which consists of a coil 17 and a set of individual switches 18a, 18b, 18c, 19a, 19b, 19c, 20a and 20b, these switches being arranged in three groups (18, 19 and 20) and being in circuit with the respective leads 11a, 11b, 11c, 12a, 12b, 12c, 13a and 13b of the respective motors 11, 12 and 13, as will be readily apparent. The several switches 18a–20b inclusive are operatively connected together by conventional mechanical means shown schematically at 21, whereby they are simultaneously closed and opened by energization and deenergization, respectively, of the relay coil 17.

A master switch 22 is provided in the current supply conductor 15 and the groups of switches 18, 19 and 20 of the main relay are connected in series with a set of fuses, or the like, 23a, 23b, 23c, 24a, 24b, 24c, 25a and 25b to the current supply, the switches in the groups 18 and 19 controlling the three-phase motors 11 and 12 being connected to the three-phase conductors 14, 15, 16, while the switches in the group 20 controlling the single phase motor 13 being connected only to the conductors 15, 16 for supply of single phase current.

The apparatus also includes a set of control relays 26, 27 and 28, each having a coil and switch means 29, 30 and 31, respectively, which switch means are closed when the associated coil is energized. As will be readily apparent, the coils of the control relays are connected independently of each other to a single phase of the three-phase current supply, namely, the coils of relays 26 and 28 are connected to the conductors 15, 16, and the coil of relay 27 is connected to conductors 14, 15, but the switch means 29, 30, 31 of the control relays are connected in series with one another and with the coil 17 of the main relay to another phase of the current supply, namely, to the conductors 14 and 16.

The operation of the apparatus will be readily apparent from the foregoing. Under normal conditions, the master switch 22 is closed to energize the coils of the control relays 26, 27, 28, thus causing current to flow through the switch means 29, 30, 31 of the control relays and also causing the coil 17 of the main relay to close the switches 18a–20b inclusive, thereby energizing the motors 11, 12, 13.

In the event of malfunctioning of any one of the motors, such as by an overload, overheated bearing, internal short circuit, or the like, a blowing of any one or more of the fuses 23b, 23c, 24a, 24b, 25a, 25b, automatically interrupts the flow of current through the coils of the associated control relays 26, 27, 28, thus interrupting the flow of current through the switch means 29, 30, 31 and deenergizing the coil 17 of the main relay, whereby the main relay switches 18a–20b inclusive are simultaneously opened and all motors 11, 12, 13 are simultaneously stopped. Also, blowing of any one or more of the fuses 23a, 24c automatically interrupts the flow of current through the switch means 29, 30, 31, with the same result as mentioned above. Moreover, even with proper functioning of all motors and without blowing of any of the fuses, a power failure in any of the supply conductors 14, 15, 16, externally of the apparatus will automatically de-energize the coil 17 of the main relay, thus simultaneously de-energizing all the motors. Thus, it will be apparent that all the motors in the group, regardless of phase and horsepower rating, are unitarily protected by the apparatus against all possible contingencies.

It may be noted that the fuses 23a–25 inclusive may be conventional fuses, "fusestats," "fusetrons," or the like, and that the blowing of any one or more of them will readily indicate to service personnel the location of the source of malfunctioning, inasmuch as each fuse is directly associated with only one motor lead.

Also, while the apparatus has been described and illustrated in conjunction with three motors, the arrangement may be expanded or contracted proportionately if a greater or a lesser number of motors are involved in the group.

Thus, while in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In an apparatus for controlling and protecting a plurality of electric motors at least one of which is a three-phase motor and at least another one of which is a single phase motor, the combination of a main relay having a coil and a set of individual switches which are simultaneously closed and opened upon energization and de-energization of said coil respectively, said coil of said main relay being connected to a single phase of a three-phase current supply, said switches being arranged in groups including a three-phase group and a single phase group connected in series with the three-phase and single phase motors respectively to three phases and a single phase respectively of said three-phase current supply, and control relays, there being one for each of the respective motors, each control relay having a coil and a set of switch points which are closed when the associated coil is energized, the coils of said control relays being connected in separate circuits each to a single phase of said current supply wherein at least one control relay coil is connected across each phase of said current supply utilized by said plurality of motors except the phase to which the main relay is connected, and the switch points thereof being connected in series with one another and with the coil of said main relay to a single phase of the current supply, whereby said motors may be simultaneously de-energized by opening of any one of said control relays.

2. The apparatus as defined in claim 1 together with a set of fuses in circuit with the respective switches of said main relay, said fuses being connected in leads between said power supply and the respective switches of said main relay.

3. In an apparatus for controlling and protecting a plurality of electric motors connected to a common multiphase current supply, at least one of said motors being a single phase motor and at least one other of said motors being a multiphase motor, said single phase motor and said multiphase motor being connected by separate current leads to said common current supply, the combination of a main relay having a coil and a plurality of switches which are simultaneously closed and opened upon energization and de-energization of said coil respectively, said coil of said main relay being connected to a single phase of said multiphase current supply, said switches being arranged in groups in the separate current leads to each electric motor wherein a switch is connected in each of the current leads from said current supply to each of said motors, and control relays, there being one for each of the respective motors, each control relay having a coil and a set of switch points which are closed when the associated coil is energized, the coils of said control relays being connected in separate circuits each to a single phase of said current supply and the switch points thereof being connected in series with one another and with the coil of said main relay to a single phase of the current supply, whereby said motors may be simultaneously de-energized by opening of any one of said control relays, there being at least one control relay coil connected across each phase of said current supply utilized by said plurality of motors except the phase to which the main relay is connected.

4. The apparatus as defined in claim 3 together with a set of fuses in circuit with the respective switches of said main relay, said fuses being connected in leads between said power supply and the respective switches of said main relay.

References Cited in the file of this patent

UNITED STATES PATENTS 2,735,976     Danly _____ Feb. 21, 1956

FOREIGN PATENTS 171,284     Austria _____ May 10, 1952